United States Patent
Yang

(10) Patent No.: US 12,481,333 B2
(45) Date of Patent: Nov. 25, 2025

(54) HINGE ASSEMBLY AND ELECTRONIC DEVICE

(71) Applicant: BEIJING XIAOMI MOBILE SOFTWARE CO., LTD., Beijing (CN)

(72) Inventor: Jieming Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 137 days.

(21) Appl. No.: 18/682,720

(22) PCT Filed: Apr. 29, 2022

(86) PCT No.: PCT/CN2022/090800
§ 371 (c)(1),
(2) Date: Feb. 9, 2024

(87) PCT Pub. No.: WO2023/015968
PCT Pub. Date: Feb. 16, 2023

(65) Prior Publication Data
US 2024/0344553 A1    Oct. 17, 2024

(30) Foreign Application Priority Data
Aug. 12, 2021  (CN) .......................... 202110926282.8

(51) Int. Cl.
*G06F 1/16*   (2006.01)
*F16C 11/10*  (2006.01)
(Continued)

(52) U.S. Cl.
CPC ............ *G06F 1/1681* (2013.01); *F16C 11/10* (2013.01); *H04M 1/0216* (2013.01); *F16C 11/04* (2013.01);
(Continued)

(58) Field of Classification Search
CPC .... G06F 1/1681; G06F 1/1616; G06F 1/1652; H04M 1/0216; H04M 1/0268; F16C 11/04; F16C 11/10
See application file for complete search history.

(56) References Cited

U.S. PATENT DOCUMENTS 9,927,841 B2 *   3/2018   Gheorghiu .......... E05D 11/0054
12,088,751 B2 *  9/2024   Kim ..................... H04M 1/0268
(Continued)

FOREIGN PATENT DOCUMENTS

KR    20180131143 A    12/2018

OTHER PUBLICATIONS

European Patent Application No. 22854965.5 Search Report dated Nov. 11, 2024, 9 pages.

*Primary Examiner* — Jeffrey O'Brien
(74) *Attorney, Agent, or Firm* — Cozen O'Connor

(57) ABSTRACT

A hinge assembly includes: a hinge body, a driving rod, a magnetic assembly and a limiting assembly. The hinge body includes a folded state and an unfolded state. The driving rod is slidably coupled to the hinge body. The driving rod is slidable relative to the hinge body along a first direction. The magnetic assembly is slidably coupled to the driving rod. The limiting assembly includes a locked state where the limiting assembly is located between two opposite surfaces of the driving rod and the magnetic assembly and an unlocked state where the limiting assembly is located outside the two opposite surfaces. When the hinge body is in the folded state, the driving rod presses against the magnetic assembly. The limiting assembly switches to the unlocked state in response to an operation instruction. The magnetic assembly moves from a first position to a second position.

20 Claims, 10 Drawing Sheets

(51) Int. Cl.
*H04M 1/02* (2006.01)
*F16C 11/04* (2006.01)

(52) U.S. Cl.
CPC ......... *G06F 1/1616* (2013.01); *G06F 1/1652* (2013.01); *H04M 1/0268* (2013.01)

(56) References Cited

U.S. PATENT DOCUMENTS

| | | | |
|---|---|---|---|
| 12,181,932 B2 * | 12/2024 | Hsiang | G06F 1/1652 |
| 12,279,387 B2 * | 4/2025 | Yun | G06F 1/1681 |
| 2007/0067954 A1 * | 3/2007 | Finney | H04M 1/0247 |
| | | | 16/235 |
| 2023/0297133 A1 * | 9/2023 | Lee | G06F 1/1683 |
| | | | 361/679.02 |
| 2024/0003482 A1 * | 1/2024 | Lee | G06F 1/1658 |
| 2024/0155791 A1 * | 5/2024 | Lee | G06F 1/1616 |
| 2024/0219958 A1 * | 7/2024 | Kinoshita | G06F 1/1681 |
| 2024/0401387 A1 * | 12/2024 | Fan | G06F 1/1681 |
| 2025/0165044 A1 * | 5/2025 | Son | H04M 1/022 |

* cited by examiner

HINGE ASSEMBLY AND ELECTRONIC DEVICE

CROSS-REFERENCE TO RELATED APPLICATIONS

The present application is a U.S. National Stage of International Application No. PCT/CN2022/090800, filed on Apr. 29, 2022, which claims the benefit of priority to Chinese patent application No. 202110926282.8, filed on Aug. 12, 2021, both of which are incorporated by reference herein in their entireties for all purposes.

BACKGROUND

With the development of flexible OLED (Organic Light Emitting Diode) display technologies and the folding electronic devices having both the portability of ordinary electronic devices and the ultimate experience of large-screen display after being unfolded, the folding electronic devices have gradually become an important trend in the development of mobile terminals and an important field of competition among major terminal manufacturers.

SUMMARY

The present disclosure relates to the field of terminals, and in particular to a hinge assembly and an electronic device.

According to a first aspect of embodiments of the present disclosure, there is provided a hinge assembly. The hinge assembly includes: a hinge body, a driving rod, a magnetic assembly, and a limiting assembly. The hinge body includes a folded state and an unfolded state. A first end of the driving rod is slidably coupled to the hinge body, when the hinge body is switched to the folded state or the unfolded state, the driving rod slides relative to the hinge body in a first direction, and the first direction is a length direction of the driving rod. The magnetic assembly is slidably coupled to a second end of the driving rod along the first direction. The limiting assembly includes a locked state and an unlocked state, a part of the limiting assembly is located between two opposite surfaces of the driving rod and the magnetic assembly when the limiting assembly is in the locked state, and the limiting assembly is located outside the two opposite surfaces of the driving rod and the magnetic assembly when the limiting assembly is in the unlocked state. When the hinge body is in the folded state, the driving rod presses against the magnetic assembly through the limiting assembly along the first direction such that the magnetic assembly is maintained in a first position; and in response to an operation instruction, the limiting assembly is switched to the unlocked state and the magnetic assembly moves from the first position towards the driving rod along the first direction to a second position.

According to a second aspect of embodiments of the present disclosure, there is provided an electronic device. The electronic device includes a first housing, a second housing, a flexible display panel and a hinge assembly any of the first aspect described above. The hinge body is coupled to the first housing and the second housing, and the magnetic assembly and the limiting assembly are both arranged in the first housing; when the hinge body is in the folded state, the first housing and the second housing are oppositely arranged, the flexible display panel is folded in half, and the magnetic assembly and the second magnetic member arranged in the second housing attract each other; and the limiting assembly is switched to the unlocked state in response to an operation instruction, the magnetic assembly moves from the first position towards the driving rod along the first direction to the second position, the magnetic assembly and the second magnetic member are released from attraction, and the flexible display panel is unfolded.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure.

DETAILED DESCRIPTION

Reference will now be made in detail to illustrative embodiments, examples of which are illustrated in the accompanying drawings. When the following description refers to the drawings, unless otherwise indicated, the same numbers in different drawings indicate the same or similar elements. The implementations described in the following illustrative embodiments do not represent all implementations consistent with the present disclosure. Rather, they are merely examples of devices and methods consistent with some aspects of the present disclosure as detailed in the appended claims.

The terminology used in the present disclosure is for the purpose of describing specific embodiments only and is not intended to limit the present disclosure. The singular forms of expressions "a", "said" and "the" used in the present disclosure and the appended claims are also intended to include the plural forms, unless the context clearly indicates other meaning. It should also be understood that the term "and/or" as used herein refers to and includes any or all possible combinations of one or more associated listed items.

It should be understood that although the terms first, second, third, etc. may be used to describe various information in the present disclosure, these information should not be limited to these terms. These terms are only used to distinguish the same type of information from each other. For example, without departing from the scope of the present disclosure, the first information may also be called the second information, and similarly, the second information may also be called the first information. Depending on the context, the word "if" as used herein may be interpreted as "at the time of" or "when" or "in response to determining that".

In the related art, the state switching of the folding electronic devices mainly depends on hinge assemblies, which drive the electronic device to fold and unfold through the folding and unfolding of the hinge assemblies.

Figure 1:
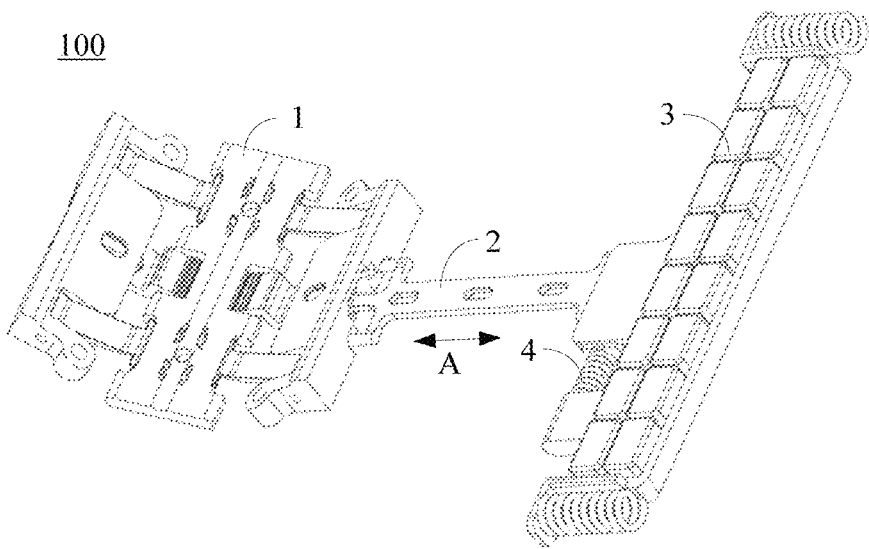
FIG. 1 is a schematic structural diagram of a hinge assembly according to an embodiment.
Figure 2:
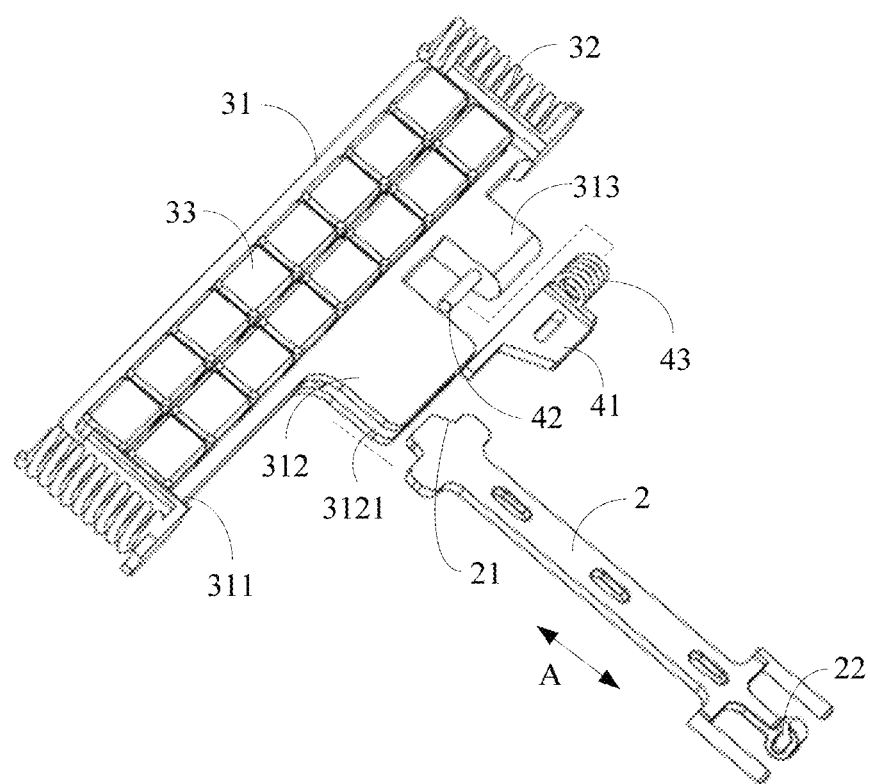
FIG. 2 is an exploded schematic diagram of a driving rod, a magnetic assembly and a limiting assembly according to an embodiment.
Figure 3:
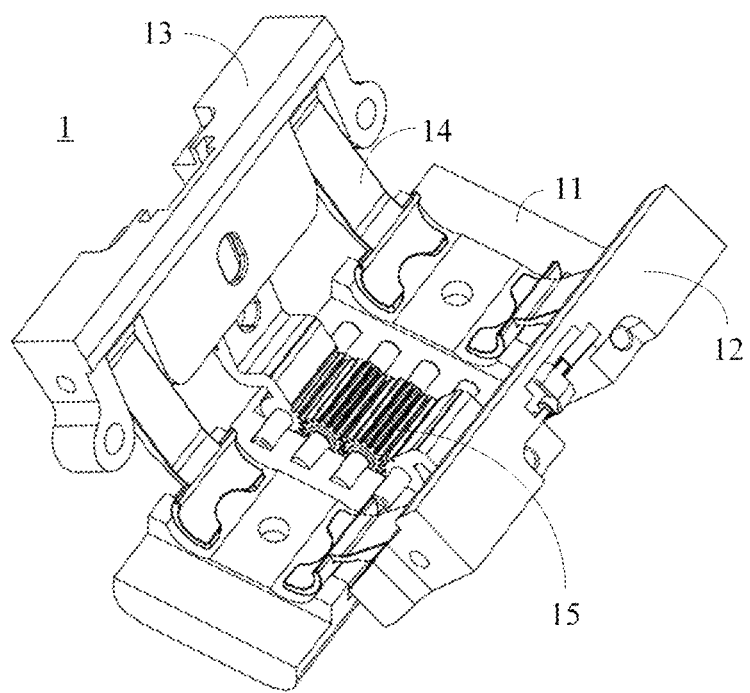
FIG. 3 is a schematic structural diagram of a hinge body according to an embodiment.

FIG. 1 is a structural schematic diagram of a hinge assembly 100 according to an illustrative embodiment. FIG. 2 is an exploded schematic diagram of a driving rod 2, a magnetic assembly 3 and a limiting assembly 4 according to an illustrative embodiment. FIG. 3 is a structural schematic diagram of a hinge body 1 according to an illustrative embodiment. As illustrated in FIGS. 1 to 3, the hinge assembly 100 may include a hinge body 1, a driving rod 2, a magnetic assembly 3 and a limiting assembly 4. The hinge body 1 may be used to couple to a housing of an electronic device equipped with the hinge assembly 100. The hinge body 1 may include the folded state and an unfolded state, and may be switched between the folded state and the unfolded state. The folded state is a state of being folded by 90 degrees relative to the unfolded state. In some embodiments, the hinge body 1 may only hover in the unfolded state and the folded state. In other embodiments, the hinge body 1 may also hover in any bending state between the unfolded state and the folded state, and the bending state may be a state of being bent by 30 degrees, 60 degrees or any other angle relative to the unfolded state, which is not limited by the present disclosure.

A first end of the driving rod 2 may be slidably coupled to the hinge body 1, and a second end of the driving rod 2 may be slidably coupled to the magnetic assembly 3 along the first direction. The magnetic assembly 3 may be coupled to the housing of the electronic device equipped with the hinge assembly 100, that is, the magnetic assembly 3 and the hinge body 1 may be relatively fixed through the housing of the electronic device, and the driving rod 2 may inherently slide relative to the magnetic assembly 3 when sliding relative to the hinge body 1. When the hinge body 1 is switched to the unfolded state or the folded state, the first end of the driving rod 2 may slide relative to the hinge body 1 along the first direction and the second end of the driving rod 2 may slide relative to the magnetic assembly 3 along the first direction. The first direction is the length direction of the driving rod 2, that is, a direction indicated by arrow A in FIGS. 1 and 2. For example, in some embodiments, when the hinge body 1 is switched to the unfolded state, the first end of the driving rod 2 may slide relative to the hinge body 1 in the direction from the upper left to the lower right in FIG. 2, and the second end of the driving rod 2 may slide relative to the magnetic assembly 3 in the direction from the upper left to the lower right in FIG. 2 to move away from the magnetic assembly 3. When the hinge body 1 is switched to the folded state, the first end of the driving rod 2 may slide relative to the hinge body 1 in the direction from the lower right to the upper left in FIG. 2, and the second end of the driving rod 2 may slide relative to the magnetic assembly 3 in the direction from the lower right to the upper left in FIG. 2 to move closer to the magnetic assembly 3. In other embodiments, when the hinge body 1 is switched to the unfolded state, the first end of the driving rod 2 may slide relative to the hinge body 1 in the direction from the lower right to the upper left in FIG. 2, and the second end of the driving rod 2 may slide relative to the magnetic assembly 3 in the direction from the lower right to the upper left in FIG. 2 to move closer to the magnetic assembly 3. When the hinge body 1 is switched to the folded state, the first end of the driving rod 2 may slide relative to the hinge body 1 in the direction from the upper left to the lower right in FIG. 2, and the second end of the driving rod 2 may slide relative to the magnetic assembly 3 in the direction from the upper left to the lower right in FIG. 2 to move away from the magnetic assembly 3, which is not limited by the present disclosure. The sliding coupling between the driving rod 2 and the hinge body 1, and the sliding coupling between the driving rod 2 and the magnetic assembly 3 may all be realized by fitting of a chute with a guide rail.

The limiting assembly 4 may include a locked state and an unlocked state. When the limiting assembly 4 is in the locked state, a part of the limiting assembly 4 may be located between two opposite surfaces of the driving rod 2 and the magnetic assembly 3. When the limiting assembly 4 is in the unlocked state, the limiting assembly 4 may move out of the two opposite surfaces of the driving rod 2 and the magnetic assembly 3. When the hinge body 1 is switched to the folded state, the limiting assembly 4 may be in the locked state, and the driving rod 2 may press against the limiting assembly 4 and then press against the magnetic assembly 3, such that the magnetic assembly 3 may be maintained in the first position. When the limiting assembly 4 is switched to the unlocked state in response to an operation instruction, the magnetic assembly 3 may move from the first position towards the driving rod 2 along the first direction to the second position.

Based on this, the magnetic assembly 3 may be pressed by the fitting of the limiting assembly 4 and the driving rod 2 may press against the magnetic assembly 3 to be kept in the first position, which is beneficial to maintaining the folded state of the hinge body 1 through the mutual attraction between the magnetic assembly 3 and the matching magnetic member, and subsequently the limiting assembly 4 may be switched to the unlocked state in response to the operation instruction, and the magnetic assembly 3 may be switched to the second position to release the interaction force of attraction. Because the flexible screen of the electronic device equipped with the hinge assembly 100 is also in the folded state when the hinge assembly 100 is in the folded state, the flexible screen may release the internal stress to restore to the flattened state without attractive force when the magnetic assembly 3 is switched to the second position, such that the hinge assembly 100 may be driven to restore to the unfolded state, and the automatic unfolding of the hinge assembly 100 and the electronic device may be realized, and the user does not need to manually unfold the folding electronic devices under the trend of lightweight and thinness, thus improving the user experience.

The magnetic assembly 3 may include a magnet bracket 31 and a first elastic member 32. The magnet bracket 31 may be slidably coupled to the driving rod 2 along the first direction. An end of the first elastic member 32 may be coupled to the magnet bracket 31, and the other end may be configured for fixing, for example, to the housing of the electronic device equipped with the hinge assembly 100. As illustrated in FIGS. 4-7, when the hinge body 1 is in the folded state, the first elastic member 32 is compressed, and when the limiting assembly 4 is switched to the unlocked state in response to an operation instruction, the limiting assembly 4 moves out from between the two opposite surfaces of the driving rod 2 and the magnet to provide a space gap for the first elastic member 32 to restore deformation, thereby providing a force to the magnet bracket 31 to move the magnet bracket 31. Therefore, the whole magnetic assembly 3 may be switched from the first position to the second position, such that the magnetic assembly 3 and the matching magnetic member no longer attract each other, and the hinge assembly 100 may be automatically unfolded by using the internal force of the flexible screen of the electronic device. The first elastic member 32 may include a compression spring.

Figure 8:
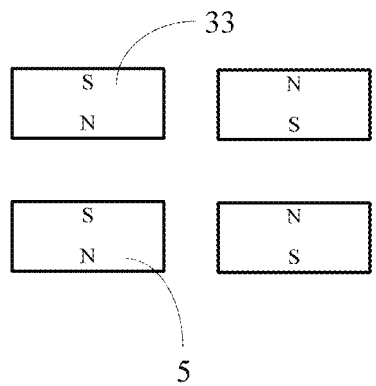
FIG. 8 is a schematic diagram showing a positional relationship between a first magnetic member and a second magnetic member according to an embodiment.
Figure 9:
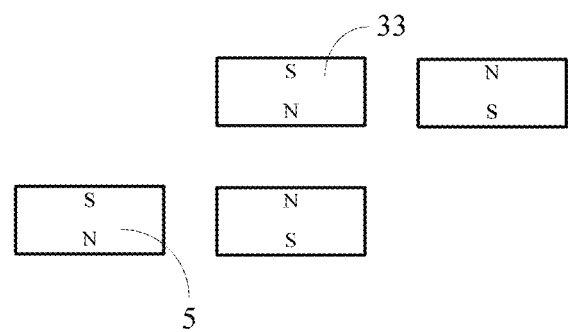
FIG. 9 is a schematic diagram showing another positional relationship between a first magnetic member and a second magnetic member according to an embodiment.

Still as illustrated in FIGS. 4-7, the magnetic assembly 3 may include a first magnetic member 33, and the magnetic member 33 may be arranged on the magnet bracket 31. The hinge assembly 100 may include a second magnetic member 5. When the magnetic assembly 3 is in the first position, as illustrated in FIG. 8, the first magnetic member 33 and the second magnetic member 5 attract each other in a direction perpendicular to the first direction. When the magnetic assembly 3 is in the second position, as illustrated in FIG. 9, the first magnetic member 33 and the second magnetic member 5 repel each other. When the magnetic assembly 3 is in the second position, the mutual repulsion between the first magnetic member 33 and the second magnetic member 5 may generate a repulsive force perpendicular to the first direction, which may provide a force for the hinge assembly 100 to restore to the unfolded state. In some embodiments, when the magnetic assembly 3 is in the second position, the force between the first magnetic member 33 and the second magnetic member 5 may be zero, and at this time, the hinge assembly 100 may be restored to the unfolded state by the internal force of the flexible screen of the electronic device equipped with the hinge assembly 100, and the electronic device may be unfolded automatically. The first magnetic member 33 may be located inside one side of the main body of the device equipped with the hinge assembly 100, and the second magnetic member 5 may be located in the other side of the main body of the device equipped with the hinge assembly 100.

Figure 10:
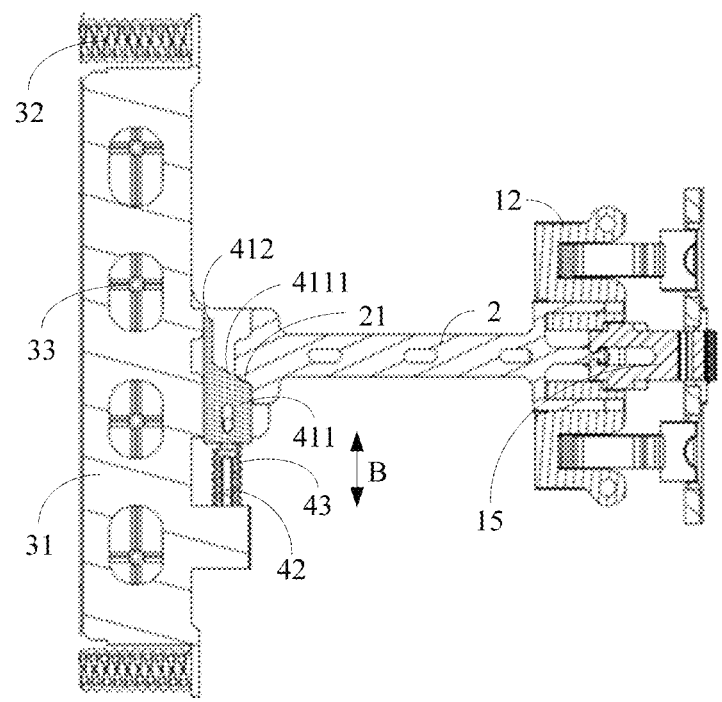
FIG. 10 is a partial sectional schematic diagram of a hinge assembly according to an embodiment.

As illustrated in FIG. 10, the limiting assembly 4 may include a limiting member 41 and a driving member 42. The driving member 42 may be fixed to the magnet bracket 31, and the limiting member 41 may be coupled to the driving member 42. The limiting member 41 may be driven to move in a second direction under the driving action of the driving member 42, that is, the limiting member 41 may move in a direction illustrated by the arrow B in FIG. 10, and the second direction is perpendicular to the first direction (the direction illustrated by the arrow A). Based on this, when the hinge body 1 is in the folded state, at least a part of the limiting member 41 may be located between the two opposite surfaces of the driving rod 2 and the magnet bracket 31, and the limiting member component 4 is in the locked state. The driving member 42 may act on the limiting member 41 in response to the operation instruction, such that the limiting member 41 moves out of the two opposite surfaces of the driving rod 2 and the magnet bracket 31, and a gap is formed between the driving rod 2 and the magnet bracket 31. The first elastic member 32 returns and pushes the magnet bracket 31, such that the magnetic assembly 3 moves from the first position towards the driving rod 2 along the first direction to the second position, and the mutual attractive force between the first magnetic member 33 and the second magnetic member 5 is released, such that the hinge body 1 may be automatically switched to the unfolded state, and the electronic device equipped with the hinge assembly 100 may be automatically unfolded.

The driving member 42 may include an output shaft, and the output shaft and the limiting member 41 may be coupled in a threaded way, such that the limiting member 41 may be driven to reciprocate in the second direction through the rotation of the output shaft; In another embodiment, the driving member 42 may include a memory metal, and the limiting member 41 is driven by the stretching and contraction of the memory metal with electricity. In some embodiments, the driving member 42 may include an electromagnet.

The limiting assembly 4 may further include a second elastic member 43, and the second elastic member 43 is arranged along the second direction. A first end of the second elastic member 43 is coupled to the magnet bracket 31, and a second end of the second elastic member 43 is coupled to the limiting member 41. When the driving member 42 responds to the operation instruction, the limiting member 41 moves along the second direction and compresses the second elastic member 43, and the limiting assembly 4 is switched to the unlocked state. At the same time, under the action of the first elastic member 32, the limiting member 41, the second elastic member 43 and the driving member 42 move with the magnet bracket 31, the driving rod 2 may limit the limiting member 41 in the second direction, and the second elastic member 43 remains in a compressed state. When the driving rod 2 slides away from the magnet bracket 31 in the first direction to release the limiting on the limiting member 41, the second elastic member 43 may be return, the limiting member 41 returns under the action of the second elastic member 43, and the limiting assembly 4 is switched to the locked state, and the limiting member 41 may be located between the two opposite surfaces of the driving rod 2 and the magnet bracket 31.

With regard to the coupling of the limiting assembly 4 to the magnet bracket 31 and the coupling between the driving rod 2 and the magnet bracket 31, detailed description will be made in the following. The magnet bracket 31 may include a body part 311, a first extension part 312 and a second extension part 313. Both of the first extension part 312 and the second extension part 313 are coupled to the body part 311, and both the first extension part 312 and the second extension part 313 are formed by extending outwards from an edge of the body part 311 parallel to the second direction, and an interval distance is defined between the first extension part and the second extension part 313 in the second direction. The first magnetic member 33 of the magnetic assembly 3 may be arranged in the body part 311, for example, the body part 311 may include an installation groove, one or a plurality of first magnetic members 33 may be arranged in the installation groove. The plurality of first magnetic members 33 may be arranged side by side or in multiple rows, and may be designed adaptively according to the shape of the installation groove, which is not limited by the present disclosure.

The first extension part 312 may include a groove 3121 that is recessed along the first direction. An end of the driving rod 2 away from the hinge body 1 may extend into the groove 3121 to be slidably coupled to the magnet bracket 31. The driving member 42 of the limiting assembly 4 may be coupled to the second extension part 313. The limiting member 41 extends toward the first extension part 312 in the second direction and extends into the groove 3121, and the limiting member 41 may be slidably coupled to the first extension part 312, such that the movement of the limiting member 41 may be limited when the driving member 42 or the second elastic member 43 subsequently acts on the limiting member 41. For example, the limiting member 41 may include a guide groove, and the first extension part 312 may include a guide block arranged in the groove 3121, and the limiting member 41 is limited by the sliding coupling between the guide block and the guide groove. Alternatively, the movement of the limiting member 41 may be limited by the fitting between the chute and the guide rail, which is not limited by the present disclosure. The shapes of the first extension part 312 and the second extension part 313 may be adaptively designed.

All the above embodiments may be applied to the technical solution that when the hinge body 1 switches to the unfolded state, the driving rod 2 moves away from the magnetic assembly 3, and when the hinge body 1 switches to the folded state, the driving rod 2 moves closer to the magnetic assembly 3; and may also be applied to the technical solution that when the hinge body 1 switches to the unfolded state, the driving rod 2 moves closer to the magnetic assembly 3, and when the hinge body 1 switches to the folded state, the driving rod 2 moves away from the magnetic assembly 3. The automatic reset in the above two structures will be illustrated as follows.

Figure 4:
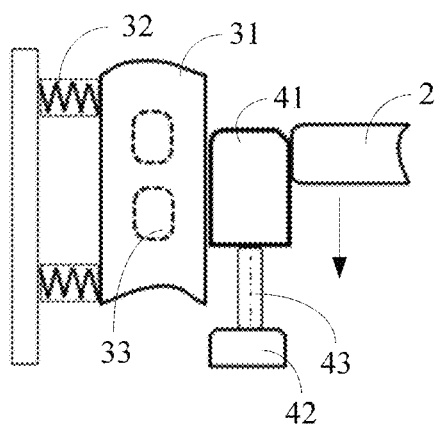
FIG. 4 is a first the schematic diagram of a motion state of a hinge assembly according to an embodiment.
Figure 5:
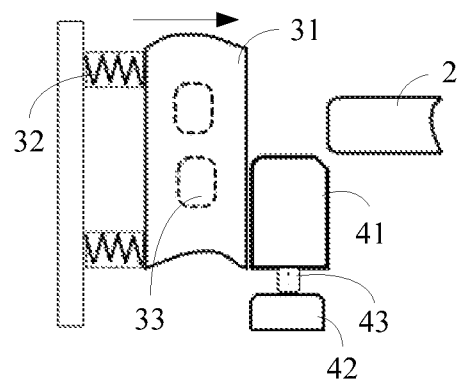
FIG. 5 is a second schematic diagram of a motion state of a hinge assembly according to an embodiment.
Figure 6:
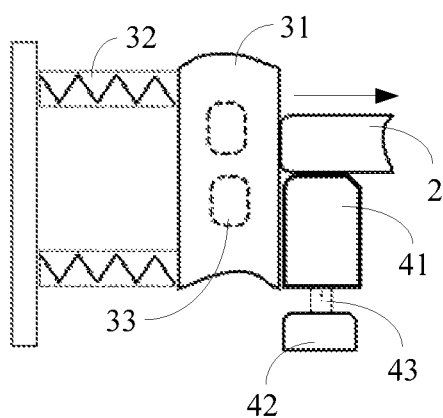
FIG. 6 is a third schematic diagram of a motion state of a hinge assembly according to an embodiment.
Figure 7:
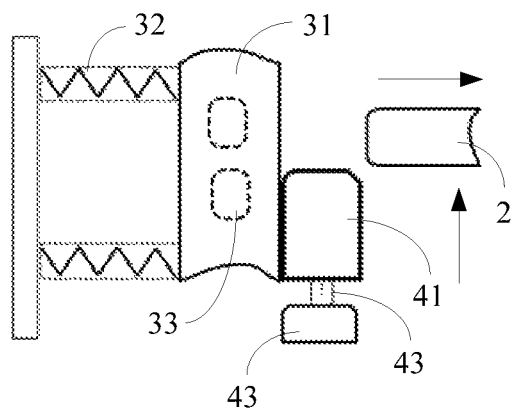
FIG. 7 is a fourth schematic diagram of a motion state of a hinge assembly according to an embodiment.

For the technical solution that the driving rod 2 moves away from the magnetic assembly 3 when the hinge body 1 is switched to the unfolded state, and the driving rod 2 moves closer to the magnetic assembly 3 when the hinge body 1 is switched to the folded state, as illustrated in FIG. 4-FIG. 7, in the process of switching the folded state of the hinge body 1, the driving rod 2 may move closer to the magnetic assembly 3 from right to left. In the process of continuous folding, an end of the driving rod 2 may press against the magnet bracket 31 through the limiting assembly 4 to further compress the first elastic member 32. The magnetic assembly 3 is in the first position, and the first elastic member 32 is in the compressed state until the hinge body 1 is switched to the folded state where the relative position relationship of the magnetic assembly 3, the limiting assembly 4 and the driving rod 2 is illustrated in FIG. 4. At this time, as illustrated in FIG. 8, the first magnetic member 33 and the second magnetic member 5 attract each other. As illustrated in FIG. 5, at the moment when the limiting assembly 4 responds to the operation instruction, the limiting assembly 4 may move out of the two opposite surfaces of the magnet bracket 31 and the driving rod 2, thus providing a space gap and the first elastic member 32 restores deformation and switches to the state illustrated in FIG. 6, the magnet bracket 31 moves in the direction from left to right in FIG. 6 under the action of the first elastic member 32, and the magnetic assembly 3 switches to the second position. At this time, as illustrated in FIG. 9, the first magnetic member 33 and the second magnetic member 33 repel each other, and under the action of the repulsive force and the flexible screen, the hinge body 1 switches to the unfolded state, and the electronic device automatically unfolds. With the continuous unfolding of the hinge body 1, the driving rod 2 may move away from the magnetic assembly 3, that is, the driving rod 2 may move in the direction from left to right in FIG. 7, and the limiting of the driving rod 2 on the limiting assembly 4 in the second direction may be released, and the second elastic member 43 may restore deformation, and under the action of the second elastic member 43, the limiting assembly 41 may move from bottom to top, and the limiting assembly 4 may be restored to the locked state, such that when the hinge assembly 100 is subsequently switched to the folded state, the driving rod 2 presses against the magnetic assembly 3 by pressing against limiting assembly 4. It should be noted that the above-mentioned directions from top to bottom and from left to right are all illustrated in the corresponding legend, and the moving direction in the actual spatial structure may be determined according to the corresponding position relationship.

Figure 11:
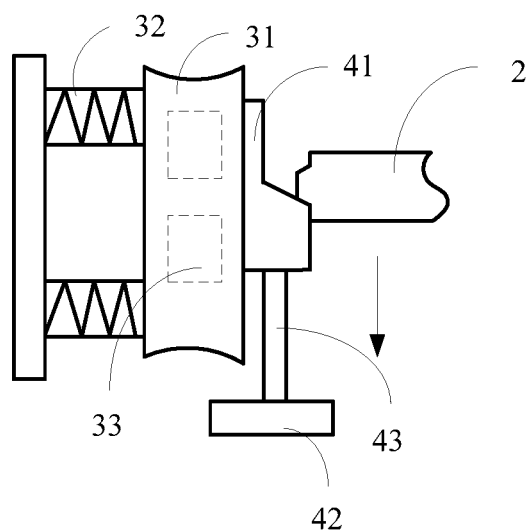
FIG. 11 is a first schematic diagram of a motion state of another hinge assembly according to an embodiment.
Figure 12:
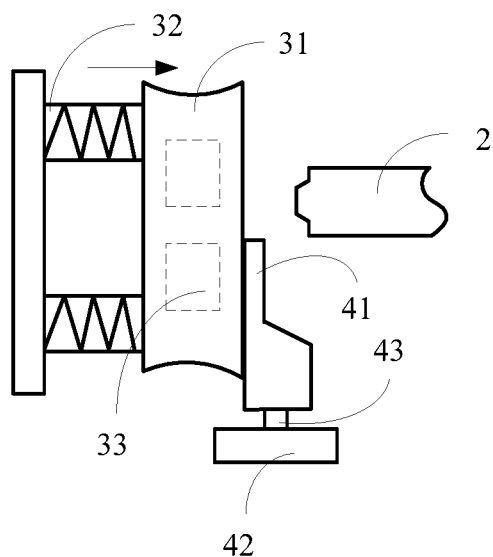
FIG. 12 is a second schematic diagram of a motion state of another hinge assembly according to an embodiment.
Figure 13:
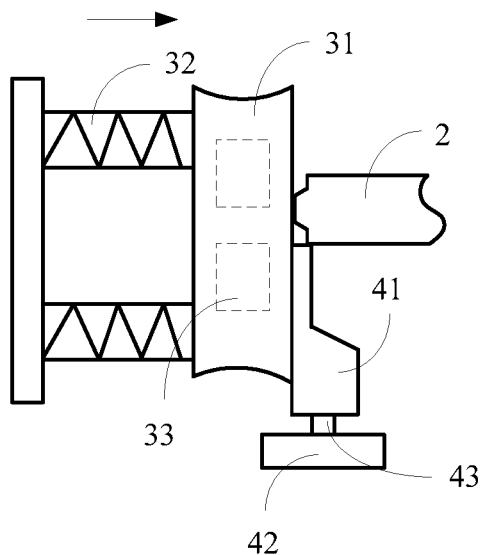
FIG. 13 is a third schematic diagram of a motion state of another hinge assembly according to an embodiment.
Figure 14:
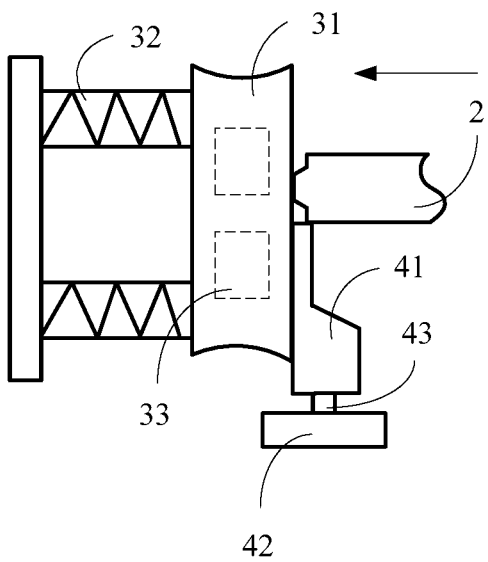
FIG. 14 is a fourth schematic diagram of a motion state of another hinge assembly according to an embodiment.
Figure 15:
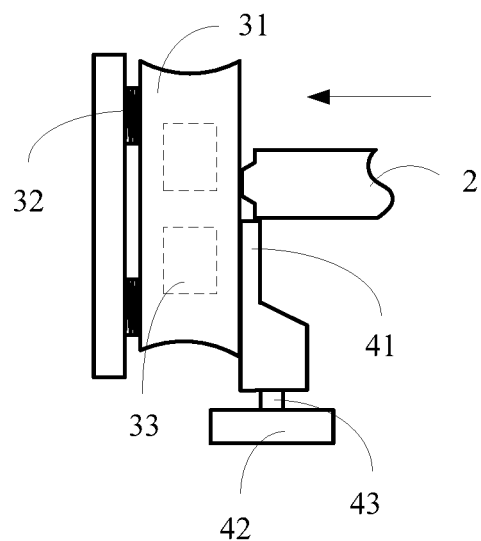
FIG. 15 is a fifth schematic diagram of a motion state of another hinge assembly according to an embodiment.
Figure 16:
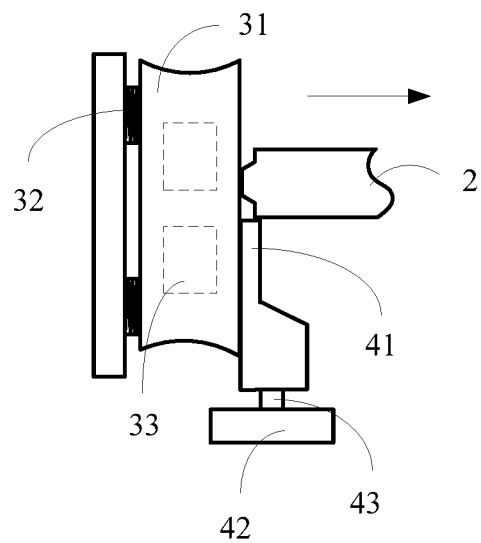
FIG. 16 is a sixth schematic diagram of a motion state of another hinge assembly according to an embodiment.
Figure 17:
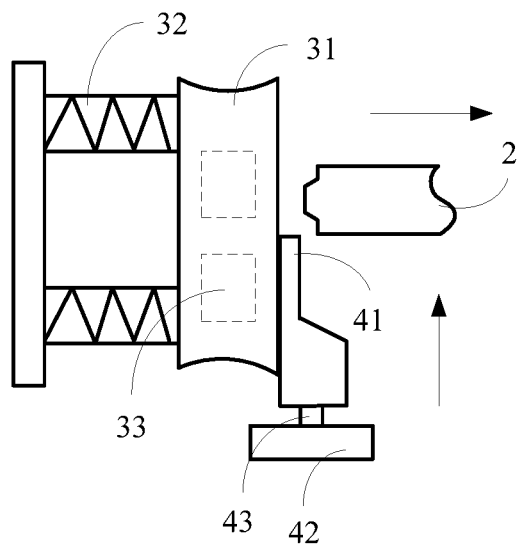
FIG. 17 is a seventh schematic diagram of a motion state of another hinge assembly according to an embodiment.
Figure 18:
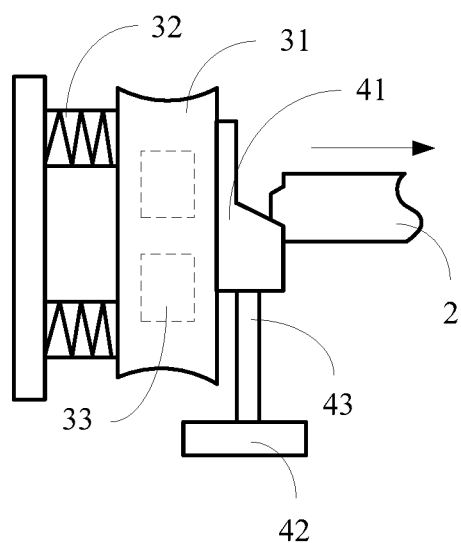
FIG. 18 is an eighth schematic diagram of a motion state of another hinge assembly according to an embodiment.

For the technical solution that the driving rod 2 moves closer to the magnetic assembly 3 when the hinge body 1 is switched to the unfolded state, and the driving rod 2 moves away from the magnetic assembly 3 when the hinge body 1 is switched to the folded state, as illustrated in FIGS. 11-18, when the hinge body 1 is in the folded state, the relative positional relationship of the driving rod 2, the limiting assembly 4 and the magnetic assembly 3 is illustrated in FIG. 11, and at this time, the limiting assembly 4 is in the locked state, the driving rod 2 presses against the magnet bracket 31 by pressing against the limiting member 41, and the first elastic member 32 is compressed. At this time, as illustrated in FIG. 8, the first magnetic member 33 and the second magnetic member 5 attract each other. As illustrated in FIG. 12, at the moment when the driving member 42 responds to the operation instruction, the limiting member 41 moves out of the two opposite surfaces of the driving rod 2 and the magnet bracket 31, such that a space gap may be provided and under the action of the first elastic member 32, the magnet bracket 31 may be pushed to slide in the direction from left to right in FIG. 2 and be switched to the state illustrated in FIG. 13, and the magnetic assembly 13 is switched to the second position. At this time, as illustrated in FIG. 9, the first magnetic member 33 and the second magnetic member 5 repel each other, and under the action of the repulsive force and the flexible screen, the hinge body 1 switches to the unfolded state, and the electronic device automatically unfolds. With the continuous unfolding of the hinge body 1, the driving rod 2 may move closer to the magnet bracket 31, that is, the driving rod 2 may move in the direction from right to left as illustrated in FIG. 14, and the driving rod 2 may continuously press against the first elastic member 32, and may continuously limit the limiting member 41 in the second direction, such that the second elastic member 43 is continuously compressed. Moreover, since the hinge body 1 has unfolded at a certain angle at this time, the first magnetic member 33 and the second magnetic member 5 cannot attract each other, so the hinge body 1 may be automatically switched to the unfolded state all the time. At this time, the relative positional relationship of the magnetic assembly 3, limiting assembly 4 and the driving rod 2 is illustrated in FIG. 15. As illustrated in FIG. 16, when the hinge body 1 needs to be switched to the folded state under the action of external force, the driving rod 2 may move away from the magnet bracket 31 from left to right as illustrated in FIG. 16, and the first elastic member 32 gradually returns, until the first elastic member 32 is in a natural state and there is a certain gap between the driving rod 2 and the magnet bracket 31 as illustrated in FIG. 17. The second elastic member 43 may restore deformation and push the limiting member 41 to move from bottom to top in FIG. 17, the limiting assembly 4 is switched to the locked state, and the first elastic member 32 may be compressed due to the extension of the limiting member 41 as illustrated in FIG. 18. With the continuous folding of the hinge body 1, the driving rod 2 moves from right to left in FIG. 18, and the first elastic member 32 restores deformation. The magnet bracket 31 and the limiting assembly 4 both move from right to left until switching to the relative positional relationship illustrated in FIG. 11. The hinge body 1 switches to the folded state.

In the embodiment illustrated in FIGS. 11-18, the limiting member 41 may include a tip end 412 and a tail part 411 coupled to the tip end 412. It may be understood that in the first direction, a width of the tail part 411 may be greater than a width of the tip end 412, and the tail part 411 may be coupled to the second elastic member 43. Based on this, because a size of the tip end 412 in the first direction is relatively small, once a small gap is generated between the magnet bracket 31 and the driving rod 2 in FIG. 17, the tip end 412 may be pushed into between the driving rod 2 and the magnet bracket 31 under the action of the second elastic member 43, and the tail part 411 may be further extended into between the driving rod 2 and the magnet bracket 31 to compress the first elastic member 32. Further, in order to improve the smoothness of switching the limiting member 41 to the locked state, the tail part 411 may include a first guide surface 4111 inclined in the direction pointing from the tip end 412 to the tail part 411, and the end of the driving rod 2 away from the hinge body 1 may include a second guide surface 21. Through the fitting of the first guide surface 4111 and the second guide surface 21, the smoothness of the tail part 411 extending into between the magnet bracket 31 and the driving rod 2 may be improved, and the compression of the first elastic member 32 may be realized.

Figure 19:
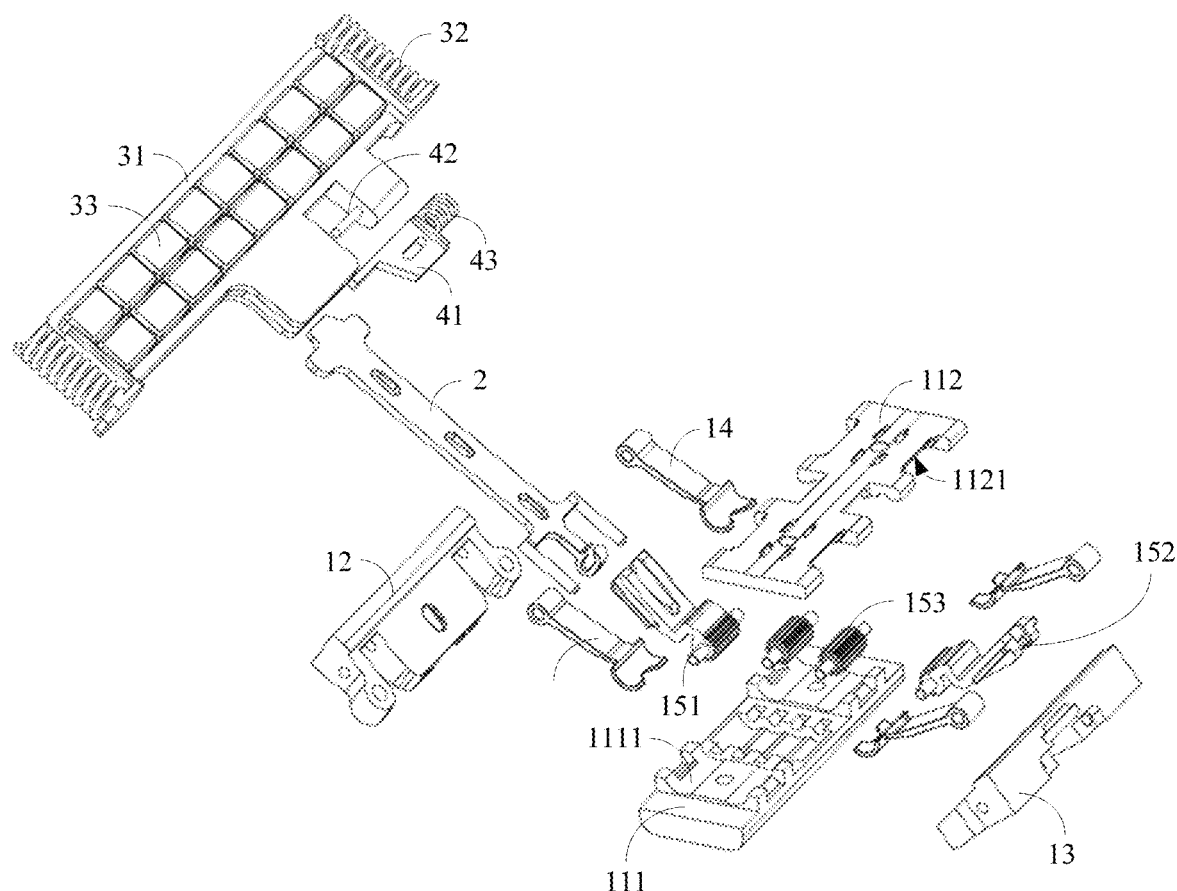
FIG. 19 is an exploded schematic diagram of a hinge assembly according to an embodiment.
Figure 20:
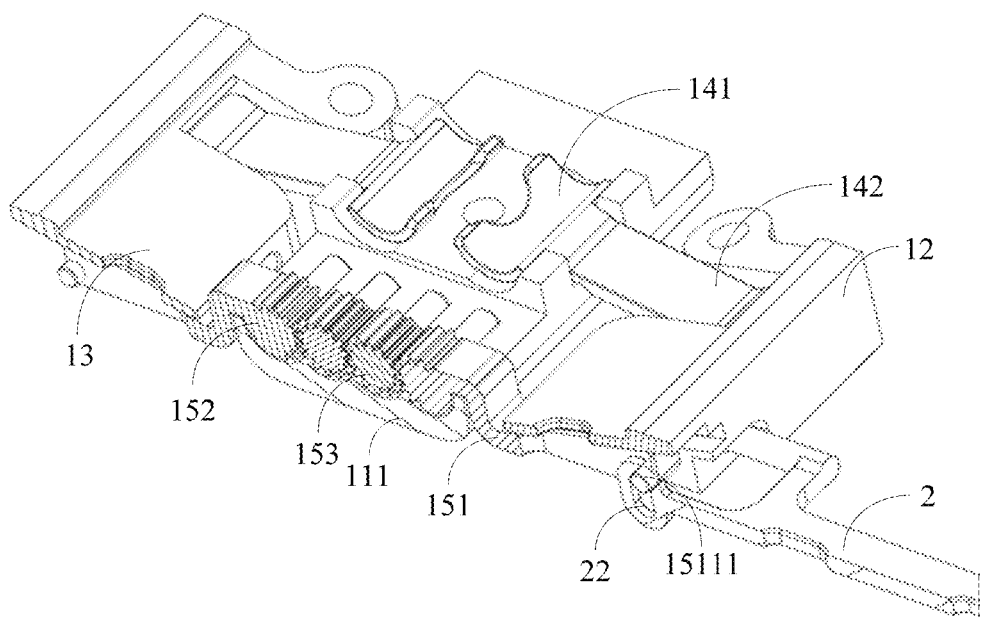
FIG. 20 is a three-dimensional sectional schematic diagram of a hinge assembly according to an embodiment.
Figure 21:
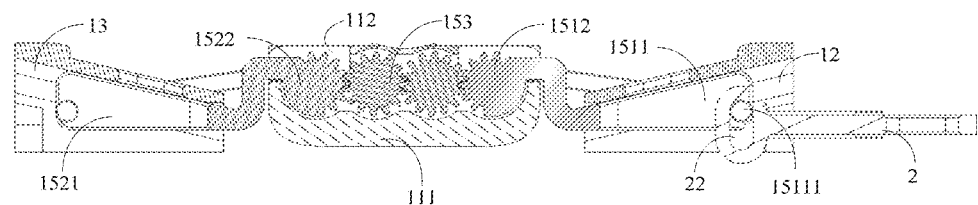
FIG. 21 is a two-dimensional sectional schematic diagram of a hinge assembly according to an embodiment.

In the above embodiments, as illustrated in FIGS. 19-21, the hinge body 1 may include a seat 11, a first support member 12 and a second support member 13. The first support member 12 is coupled to a first side of the seat 11, and the second support member 13 is coupled to a second side of the seat 11. The driving rod 2 may be slidably coupled to the first support member 12. When the hinge body 1 is switched to the folded state, the first support member 12 and the second support member 13 may rotate relative to the seat 11 and move in a direction away from the seat 11, the first end of the driving rod 2 fitted with the first support member 12 may slide relative to the first support member 12, and the second end of the driving rod 2 may slide relative to the magnet bracket 31 and the driving rod 2 moves away from the magnet bracket 31. When the hinge body 1 is switched to the unfolded state, the first support member 12 and the second support member 13 separately rotate relative to the seat 11 and move in the direction closer to the seat 11. The first end of the driving rod 2 fitted with the first support member 12 may slide relative to the first support member 12, and the second end of the driving rod 2 may slide relative to the magnet bracket 31 and the driving rod 2 moves closer to the magnet bracket 31.

In order to realize the movement of the first support member 12 and the second support member 13 relative to the seat 11, the hinge body 1 may further include a plurality of control pull-rods 14. At least one control pull-rod 14 has a first end movably coupled to the seat 11 and a second end rotatably coupled to the first support member 12, and at least one control pull-rod 14 has a first end movably coupled to the seat 11 and a second end rotatably coupled to the second support member 13. When the control pull-rod 14 coupled to the first support member 12 moves relative to the seat 11, the first support member 12 may be driven to rotate relative to the seat 11, and the first support member 12 may be moved closer to or away from the seat 11. When the control pull-rod 14 coupled to the second support member 13 moves relative to the seat 11, the second support member 13 may be driven to rotate relative to the seat 11, and the second support member 13 may be moved closer to or away from the seat 11. In the embodiments provided by the present disclosure, the hinge body 1 includes four control pull-rods 14, which are symmetrically arranged in pairs; In other embodiments, the hinge body 1 may also include two or three control pull-rods 14 or other numbers of control pull-rods 14, which is not limited by the present disclosure.

Specifically, the seat 11 may include an arc-shaped track, and each control pull-rod 14 may include an arc-shaped guide part 141 and a rotating part 142 coupled to the arc-shaped guide part 141. The rotating part 142 is configured to rotatably coupling to the first support member 12 or the second support member 13, and the arc-shaped guide part 141 may be fitted with the arc-shaped track of the seat 11. When the arc-shaped guide part 141 moves relative to the arc-shaped track of the seat 11, the rotating part 142 may be pushed to move along the length direction of the control pull-rod 14, such that the rotating part 142 of the control pull-rod 14 coupled to the first support member 12 may drive the first support member 12 to move closer to or away from the seat 11 while driving the first support member 12 to rotate relative to the seat 11, and the rotating part 142 of the control pull-rod 14 coupled to the second support member 13 may drive the second support member 13 move closer to or away from the seat 11 while driving the second support member 13 to rotate relative to the seat 11.

The seat 11 may include a bracket 111 and a cover 112 coupled to the bracket 111. The bracket 111 may include an arc-shaped recessed part 1111, and the cover 112 may include an arc-shaped protruded part 1121. The arc-shaped protruded part 1121 may extend into the arc-shaped recessed part 1111 to form the arc-shaped track when the cover 112 is assembled with the bracket 111. The arc-shaped track may be formed by assembling the bracket 111 and the cover 112, facilitating the installation of the control pull-rod 14. The arc-shaped recessed part 1111 may have a semicircle shape, the arc-shaped protruded part 1121 may have a semicircle shape, but a radius of the arc-shaped protruded part 1121 is smaller than a radius of the arc-shaped recessed part 1111, such that when the arc-shaped protruded part 1121 is fitted with the arc-shaped recessed part 1111, the arc-shaped track may be formed due to the radius difference. The arc-shaped guide part 141 may have a semicircle shape to fit with the arc-shaped track. The arc-shaped protruded part 1121 and the arc-shaped recessed part 1111 having the semicircle shape are described herein as an example only, and in other embodiments, they may also have other shapes, as long as a displacement change may occur while a movable part rotates relative to the arc-shaped track.

In order to realize mutual folding between the first support member 12 and the second support member 13, the hinge body 1 may further include a synchronization mechanism 15. The synchronization mechanism 15 may include a first guide rod gear 151 and a second guide rod gear 152. The first guide rod gear 151 includes a first guide rod end 1511 and a first gear end 1512, and the second guide rod gear 152 includes a second guide rod end 1521 and a second gear end 1522. The first gear end 1512 and the second gear end 1522 are directly or indirectly meshed, and the first gear end 1512 and the second gear end 1522 are rotatably coupled to the seat 11. The first guide rod end 1511 is slidably coupled to the first support member 12, and the second guide rod end 1521 is slidably coupled to the second support member 13. Based on this, when the first support member 12 of the seat 11 is rotated relative to the seat 11 by an external force, the control pull-rod 14 may be driven to rotate relative to the seat 11, such that the first support member 12 moves away from or closer to the seat 11. At the same time, due to the relative rotation between the seat 11 and the first support member 12, the first gear end 1512 of the first guide rod gear 151 rotates synchronously, such that the second gear end 1522 of the second guide rod gear 152 is driven to rotate synchronously, to realize that the hinge body 1 is folded in half.

In some embodiments, the driving rod 2 may be directly rotatably coupled to the seat 11, and simultaneously slidably coupled to the first support member 12 and the magnet bracket 31 in the first direction, such that when the first support member 12 rotates relative to the seat 11 and moves away from or closer to the seat 11, the driving rod 2 may also rotate relative to the seat 11 and move closer to or away from the magnet bracket 31 along the first direction. In the embodiments provided by the present disclosure, the driving rod 2 may include a mating slot 22, and the first guide rod end 1511 of the first guide rod gear 151 may include a column 15111. The column 15111 may extend into the mating slot 22. At this time, when the first gear end 1512 of the first guide rod gear 151 rotates, the driving rod 2 may be synchronously driven to rotate relative to the seat 11 through the column 15111, and at the same time, the driving rod 2 may slide in the first direction relative to the first support member 12 and the magnet bracket 31. Compared to the solution of rotatable coupling between the driving rod 2 and the seat 11, the present disclosure is beneficial to shortening the length of the driving rod 2 and improving the strength of the driving rod 2.

In some embodiments, the first gear end 1512 and the second gear end 1522 may directly mesh with each other. In other embodiments, as provided by the present disclosure, the synchronization mechanism 15 may further include a gear set 153. The gear set 153 may include an even number of gears, and the gear set 153 may have a first end gear meshing with the first gear end 1512 and a second end gear meshing with the second gear end 1522. For example, in FIG. 20, the gear set 153 includes two gears meshed with each other, with a left gear meshing with the second gear end 1522, and a right gear meshing with the first gear end 1512, to realize power transmission. Moreover, through an even number of gears, both the first gear end 1512 and the second gear end 1522 may be ensured to rotate towards the same side of the seat 11.

In the above description, when the hinge body 1 is switched to the unfolded state, the driving rod 2 moves closer to the magnetic assembly 3, and when the hinge body 1 is switched to the folded state, the driving rod 2 moves away from the magnetic assembly 3. In other embodiments, the hinge body 1 may include a seat 11, a first support member 12 and a second support member 13. The first support member 12 is coupled to a first side of the seat 11, and the second support member 13 is coupled to a second side of the seat 11. The driving rod 2 may be slidably coupled to the first support member 12. When the hinge body 1 is switched to the folded state, the first support member 12 and the second support member 13 may rotate relative to the seat 11 and move in the direction away from the seat 11, the first end of the driving rod 2 fitted with the first support member 12 may slide relative to the first support member 12, the second end of the driving rod 2 may slide relative to the magnet bracket 31, and the driving rod 2 moves closer to the magnet bracket 31. When the hinge body 1 is switched to the unfolded state, the first support member 12 and the second support member 13 separately rotate relative to the seat 11 and move in the direction closer to the seat 11. The first end of the driving rod 2 fitted with the first support member 12 may slide relative to the first support member 12, the second end of the driving rod 2 may slide relative to the magnet bracket 31, and the driving rod 2 moves away from the magnet bracket 31, to release the limiting on the limiting assembly 4.

In the above embodiments, the slidable coupling between the first guide rod end 1511 and the first support member 12, the slidable coupling between the second guide rod end 1521 and the second support member 13, the slidable coupling between the driving rod 2 and the first support member 12, and the slidable coupling between the driving rod 2 and the magnet bracket 31 may all be realized by the way that the chute and the guide rail are fitted. The chute may be an open chute or a through chute, and the guide rail may be designed adaptively according to the structure and form of the chute, which is not limited by the present disclosure.

Figure 22:
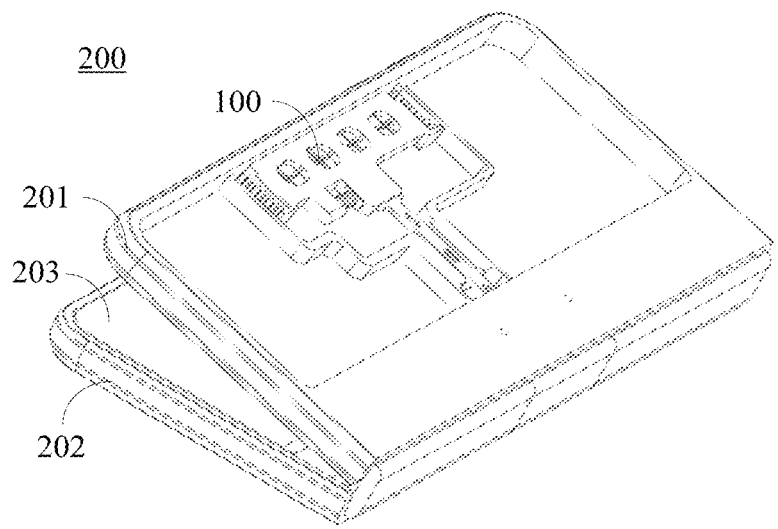
FIG. 22 is a schematic structural diagram of an electronic device according to an embodiment.
Figure 23:
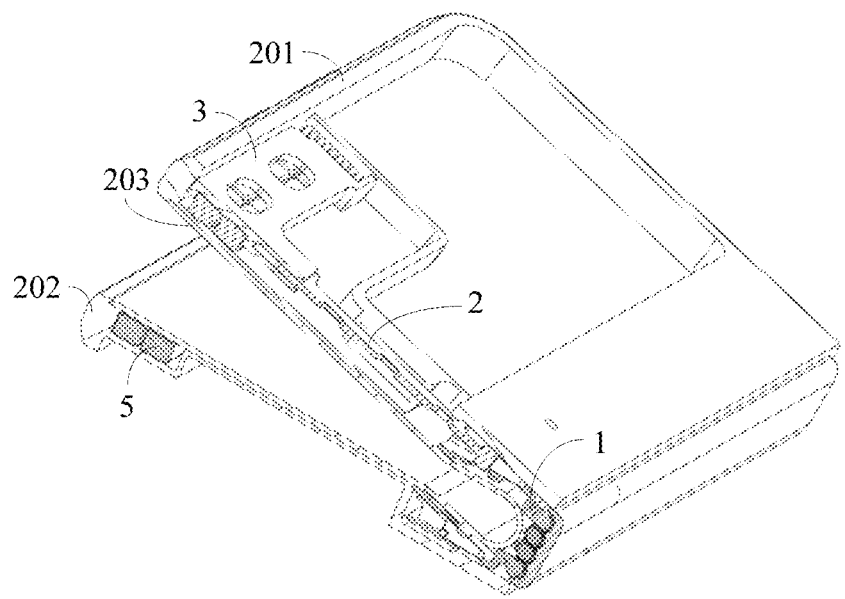
FIG. 23 is a schematic sectional diagram of an electronic device according to an embodiment.

As illustrated in FIGS. 22 and 23, the present disclosure also provides an electronic device 200. The electronic device 200 may include a first housing 201, a second housing 202, a flexible display panel 203 and a hinge assembly 100 described in any of the above embodiments, and the flexible display panel 203 may be arranged on the first housing 201 and the second housing 202. The hinge body 1 of the hinge assembly 100 may be coupled to the first housing 201 and the second housing 202, for example, the first housing 201 may be coupled to the first support member 12, and the second housing 202 may be coupled to the second support member 13. Both the magnetic assembly 3 and the limiting assembly 4 of the hinge assembly 100 may be arranged in the first housing 201, the first elastic member 32 of the magnetic assembly 3 may be fixedly coupled to the first housing, and the magnet bracket 31 may be slidably coupled to the first housing.

When the hinge body 1 is in the folded state, the first housing and the second housing are oppositely arranged, the flexible display panel is folded in half, and the first magnetic member 33 of the magnetic assembly 3 may attract the second magnetic member 5 arranged in the second housing. However, when the limiting assembly 4 is switched to the unlocked state in response to the operation instruction, the magnetic assembly 3 moves from the first position to the second position along the first direction towards the driving rod 2, the second magnetic member 5 of the magnetic assembly 3 is released from attraction, and the flexible display panel is unfolded under the action of internal force, thereby pushing the hinge body 1 to automatically switch to the unfolded state, and the electronic device is automatically unfolded, thus solving the disadvantages of the electronic device when the user unfold it with one hand under the trend of thin and lightweight electronic device.

According to a first aspect of embodiments of the present disclosure, there is provided a hinge assembly. The hinge assembly includes: a hinge body, a driving rod, a magnetic assembly, and a limiting assembly. The hinge body includes a folded state and an unfolded state. A first end of the driving rod is slidably coupled to the hinge body, when the hinge body is switched to the folded state or the unfolded state, the driving rod slides relative to the hinge body in a first direction, and the first direction is a length direction of the driving rod. The magnetic assembly is slidably coupled to a second end of the driving rod along the first direction. The limiting assembly includes a locked state and an unlocked state, a part of the limiting assembly is located between two opposite surfaces of the driving rod and the magnetic assembly when the limiting assembly is in the locked state, and the limiting assembly is located outside the two opposite surfaces of the driving rod and the magnetic assembly when the limiting assembly is in the unlocked state. When the hinge body is in the folded state, the driving rod presses against the magnetic assembly through the limiting assembly along the first direction such that the magnetic assembly is maintained in a first position; and in response to an operation instruction, the limiting assembly is switched to the unlocked state and the magnetic assembly moves from the first position towards the driving rod along the first direction to a second position.

In some embodiments, the magnetic assembly includes: a magnet bracket slidably coupled to the driving rod along the first direction; and a first elastic member having a first end configured for fixing and a second end coupled to the magnet bracket, when the hinge body is in the folded state, the first elastic member is compressed, and when the limiting assembly is switched to the unlocked state in response to an operation instruction, the first elastic member returns to push the magnetic assembly to move from the first position towards the driving rod along the first direction to the second position.

In some embodiments, the magnetic assembly includes a first magnetic member arranged on the magnet bracket; and the hinge assembly further includes a second magnetic member; when the magnetic assembly is in the first position, the first magnetic member and the second magnetic member attract each other along a direction perpendicular to the first direction; and when the magnetic assembly is in the second position, an interaction force between the first magnetic member and the second magnetic member is zero.

In some embodiments, the limiting assembly includes: a limiting member; and a driving member fixed on the magnet bracket, and configured to drive the limiting member to move along a second direction perpendicular to the first direction, when the hinge body is in the folded state, the limiting member is located between the two opposite surfaces of the driving rod and the magnet bracket, the driving rod presses against the magnet bracket through the limiting member along the first direction, and the first elastic member is compressed; and the driving member responds to an operation instruction, the limiting assembly is switched to the unlocked state, the limiting assembly moves out of the two opposite surfaces of the driving rod and the magnetic assembly, a gap is formed between the driving rod and the magnet, the first elastic member returns to push the magnet bracket, and the magnetic assembly moves from the first position towards the driving rod along the first direction to the second position.

In some embodiments, the magnetic assembly further includes a second elastic member arranged along the second direction, and having a first end coupled to the magnet bracket and a second end coupled to the limiting member, when the driving member responds to an operation instruction, the limiting member moves in the second direction and compresses the second elastic member, the limiting assembly is switched to the unlocked state, the limiting member, the second elastic member and the driving member move with the magnet bracket, and the driving rod limits the limiting member in the second direction; and when the driving rod slides away from the magnet bracket in the first direction to release limiting on the limiting member, the second elastic member returns, the limiting member returns, and the limiting assembly is switched to the locked state.

In some embodiments, the magnet bracket includes a body part, a first extension part and a second extension part, the first extension part and the second extension part extend from an edge of the body part parallel to the second direction; and the first magnetic member is arranged on the body part, the first extension part includes a groove recessed along the first direction, an end of the driving rod away from the hinge body extends into the groove and is slidably coupled to the magnet bracket, the driving member is coupled to the second extension part, and the limiting member extends into the groove along the second direction and is slidably coupled to the first extension part.

In some embodiments, the hinge body includes a seat, a first support member and a second support member, the first support member and the second support member are respectively coupled to two sides of the seat, and the driving rod is slidably coupled to the first support member along the first direction; and when the hinge body is switched to the folded state, the first support member and the second support member separately rotate relative to the seat and move away from the seat, and the driving rod slides along the first direction relative to the first support member and moves closer to the magnet bracket to press against the limiting member; when the hinge body is switched to the unfolded state, the first support member and the second support member separately rotate relative to the seat and move closer to the seat, the driving rod slides along the first direction relative to the first support member and moves away from the magnet bracket, the second elastic member returns, and the limiting assembly is switched to the locked state.

In some embodiments, the hinge body includes a seat, a first support member and a second support member, the first support member and the second support member are respectively coupled to two sides of the seat, and the driving rod is slidably coupled to the first support member along the first direction; when the hinge body is in the folded state, the driving rod presses against the limiting member and the magnet bracket, the first elastic member is compressed, and when the driving member responds to an operation instruction, the limiting assembly is switched to the unlocked state, the first elastic member returns, the hinge body is switched to the unfolded state, the first support member and the second support member separately rotate relative to the seat and move closer to the seat, the driving rod slides along the first direction relative to the first support member and move closer to the magnet bracket, and the first elastic member is compressed; and when the hinge body is switched from the unfolded state to the folded state, the first support member and the second support member separately rotate relative to the seat and move away from the seat, the driving rod slides relative to the first support member along the first direction and moves away from the magnet bracket, the first elastic member returns until the driving rod releases the limiting on the limiting member, the second elastic member returns, and the limiting is switched to the locked state.

In some embodiments, the limiting member includes a tail part and a tip end coupled to the tail part, and the tail part is coupled to the second elastic member.

In some embodiments, the tail part includes a first guide surface inclined along a direction pointing from the tip end to the tail part, and the driving rod includes a second guide surface located at the end far away from the hinge body, and the second guide surface is configured to fit with the first guide surface.

In some embodiments, the hinge body includes a plurality of control pull-rods, at least one control pull-rod having a first end movably coupled to the seat and a second end rotatably coupled to the first support member, and at least one control pull-rod has a first end movably coupled to the seat and a second end rotatably coupled to the second support member; any one of the control pull-rods is configured to drive the first support member or the second support member to rotate relative to the seat, and allow the first support member or the second support member to move away from or closer to the seat when rotating.

In some embodiments, the seat includes an arc-shaped track; each control pull-rod includes an arc-shaped guide part and a rotating part coupled to the arc-shaped guide part, the rotating part is rotatably coupled to the first support member or the second support member, and the arc-shaped guide part is fitted with the arc-shaped track to drive the first support member or the second support member to rotate relative to the seat, and push the first support member or the second support member to move away from or closer to the seat when the arc-shaped guide part moves along the arc-shaped track.

In some embodiments, the seat includes a bracket and a cover, the bracket includes an arc-shaped recessed part and the cover includes an arc-shaped protruded part, and the arc-shaped protruded part is arranged in the arc-shaped recessed part to cooperatively form the arc-shaped track.

In some embodiments, the hinge body further includes: a synchronization mechanism including a first guide rod gear and a second guide rod gear, the first guide rod gear includes a first guide rod end and a first gear end, the second guide rod gear includes a second guide rod end and a second gear end, the second gear end is meshed with the first gear end, and the first gear end and the second gear end are rotatably coupled to the seat; the first guide rod end is slidably coupled to the first support member, and the second guide rod end is slidably coupled to the second support member.

In some embodiments, the driving rod includes a mating slot, and the first guide rod end includes a column, and the column extends into the mating slot to drive the driving rod to rotate relative to the seat and move relative to the first support member along the first direction when the first guide rod gear rotates.

In some embodiments, the synchronization mechanism further includes a gear set including an even number of gears meshed with each other, and the gear set has a first end gear meshed with the first gear end and a second end gear meshed with the second gear end.

In some embodiments, the first end of the driving rod is rotatably coupled to the seat, the second end of the driving rod faces the magnet bracket, and the driving rod is slidably coupled to the first support member and the magnet bracket along the first direction.

According to a second aspect of embodiments of the present disclosure, there is provided an electronic device. The electronic device includes a first housing, a second housing, a flexible display panel and a hinge assembly any of the first aspect described above. The hinge body is coupled to the first housing and the second housing, and the magnetic assembly and the limiting assembly are both arranged in the first housing; when the hinge body is in the folded state, the first housing and the second housing are oppositely arranged, the flexible display panel is folded in half, and the magnetic assembly and the second magnetic member arranged in the second housing attract each other; and the limiting assembly is switched to the unlocked state in response to an operation instruction, the magnetic assembly moves from the first position towards the driving rod along the first direction to the second position, the magnetic assembly and the second magnetic member are released from attraction, and the flexible display panel is unfolded.

Other embodiments of the present disclosure will easily occur to those skilled in the art after considering the specification and practicing the disclosure disclosed herein. This disclosure is intended to cover any variations, uses or adaptations of the present disclosure, which follow the general principles of the present disclosure and include common knowledge or common technical means in this technical field that are not disclosed in the present disclosure. The specification and examples are to be regarded as illustrative only, with the true scope and spirit of the disclosure being indicated by the following claims.

It should be understood that the present disclosure is not limited to the precise structure described above and illustrated in the drawings, and various modifications and changes may be made without departing from its scope. The scope of the present disclosure is limited only by the appended claims.

What is claimed is:

1. A hinge assembly, comprising:
   a hinge body comprising a folded state and an unfolded state;
   a driving rod, a first end of the driving rod being slidably coupled to the hinge body, wherein when the hinge body is switched to the folded state or the unfolded state, the driving rod slides relative to the hinge body in a first direction, the first direction being a length direction of the driving rod;
   a magnetic assembly slidably coupled to a second end of the driving rod along the first direction; and
   a limiting assembly comprising a locked state and an unlocked state, a part of the limiting assembly being located between two opposite surfaces of the driving rod and the magnetic assembly when the limiting assembly is in the locked state, and the limiting assembly being located outside the two opposite surfaces of the driving rod and the magnetic assembly when the limiting assembly is in the unlocked state,
   wherein when the hinge body is in the folded state, the driving rod presses against the magnetic assembly through the limiting assembly along the first direction such that the magnetic assembly is maintained in a first position; and in response to an operation instruction, the limiting assembly is switched to the unlocked state and the magnetic assembly moves from the first position towards the driving rod along the first direction to a second position.

2. The hinge assembly according to claim 1, wherein the magnetic assembly comprises:
   a magnet bracket slidably coupled to the driving rod along the first direction; and
   a first elastic member having a first end configured for fixing and a second end coupled to the magnet bracket, wherein when the hinge body is in the folded state, the first elastic member is compressed, and when the limiting assembly is switched to the unlocked state in response to an operation instruction, the first elastic member returns to push the magnetic assembly to move from the first position towards the driving rod along the first direction to the second position.

3. The hinge assembly according to claim 2, wherein the magnetic assembly comprises a first magnetic member arranged on the magnet bracket; and the hinge assembly further comprises a second magnetic member;

when the magnetic assembly is in the first position, the first magnetic member and the second magnetic member attract each other along a direction perpendicular to the first direction; and when the magnetic assembly is in the second position, an interaction force between the first magnetic member and the second magnetic member is zero.

4. The hinge assembly according to claim 2, wherein the limiting assembly comprises:

a limiting member; and a driving member fixed on the magnet bracket, and configured to drive the limiting member to move along a second direction perpendicular to the first direction, wherein when the hinge body is in the folded state, the limiting member is located between the two opposite surfaces of the driving rod and the magnet bracket, the driving rod presses against the magnet bracket through the limiting member along the first direction, and the first elastic member is compressed; and the driving member responds to an operation instruction, the limiting assembly is switched to the unlocked state, the limiting assembly moves out of the two opposite surfaces of the driving rod and the magnetic assembly, a gap is formed between the driving rod and the magnet bracket, the first elastic member returns to push the magnet bracket, and the magnetic assembly moves from the first position towards the driving rod along the first direction to the second position.

5. The hinge assembly according to claim 4, further comprising a second elastic member arranged along the second direction, and having a first end coupled to the magnet bracket and a second end coupled to the limiting member, wherein when the driving member responds to an operation instruction, the limiting member moves in the second direction and compresses the second elastic member, the limiting assembly is switched to the unlocked state, the limiting member, the second elastic member and the driving member move with the magnet bracket, and the driving rod limits the limiting member in the second direction; and when the driving rod slides away from the magnet bracket in the first direction to release limiting on the limiting member, the second elastic member returns, the limiting member returns, and the limiting assembly is switched to the locked state.

6. The hinge assembly according to claim 4, wherein the magnet bracket comprises a body part, a first extension part and a second extension part, the first extension part and the second extension part extend from an edge of the body part parallel to the second direction; and the first magnetic member is arranged on the body part, the first extension part comprises a groove recessed along the first direction, an end of the driving rod away from the hinge body extends into the groove and is slidably coupled to the magnet bracket, the driving member is coupled to the second extension part, and the limiting member extends into the groove along the second direction and is slidably coupled to the first extension part.

7. The hinge assembly according to claim 5, wherein the hinge body comprises a seat, a first support member and a second support member, the first support member and the second support member are respectively coupled to two sides of the seat, and the driving rod is slidably coupled to the first support member along the first direction; and when the hinge body is switched to the folded state, the first support member and the second support member separately rotate relative to the seat and move away from the seat, and the driving rod slides along the first direction relative to the first support member and moves closer to the magnet bracket to press against the limiting member; when the hinge body is switched to the unfolded state, the first support member and the second support member separately rotate relative to the seat and move closer to the seat, the driving rod slides along the first direction relative to the first support member and moves away from the magnet bracket, the second elastic member returns, and the limiting assembly is switched to the locked state.

8. The hinge assembly according to claim 5, wherein the hinge body comprises a seat, a first support member and a second support member, the first support member and the second support member are respectively coupled to two sides of the seat, and the driving rod is slidably coupled to the first support member along the first direction;

when the hinge body is in the folded state, the driving rod presses against the limiting member and the magnet bracket, the first elastic member is compressed, and when the driving member responds to an operation instruction, the limiting assembly is switched to the unlocked state, the first elastic member returns, the hinge body is switched to the unfolded state, the first support member and the second support member separately rotate relative to the seat and move closer to the seat, the driving rod slides along the first direction relative to the first support member and moves closer to the magnet bracket, and the first elastic member is compressed; and when the hinge body is switched from the unfolded state to the folded state, the first support member and the second support member separately rotate relative to the seat and move away from the seat, the driving rod slides relative to the first support member along the first direction and moves away from the magnet bracket, the first elastic member returns until the driving rod releases the limiting on the limiting member, the second elastic member returns, and the limiting member is switched to a locked state.

9. The hinge assembly according to claim 8, wherein the limiting member comprises a tail part and a tip end coupled to the tail part, and the tail part is coupled to the second elastic member.

10. The hinge assembly according to claim 9, wherein the tail part comprises a first guide surface inclined along a direction pointing from the tip end to the tail part, and the driving rod comprises a second guide surface located at the end away from the hinge body, and the second guide surface is configured to fit with the first guide surface.

11. The hinge assembly according to claim 8, wherein the hinge body comprises a plurality of control pull-rods, at least one control pull-rod has a first end movably coupled to the seat and a second end rotatably coupled to the first support member, and at least one control pull-rod has a first end movably coupled to the seat and a second end rotatably coupled to the second support member;

wherein any one of the control pull-rods is configured to drive the first support member or the second support member to rotate relative to the seat, and allow the first support member or the second support member to move away from or closer to the seat when rotating.

12. The hinge assembly according to claim 11, wherein the seat comprises an arc-shaped track;

each control pull-rod comprises an arc-shaped guide part and a rotating part coupled to the arc-shaped guide part, and the rotating part is rotatably coupled to the first support member or the second support member, and the arc-shaped guide part is fitted with the arc-shaped track to drive the first support member or the second support member to rotate relative to the seat, and push the first support member or the second support member to move away from or closer to the seat when the arc-shaped guide part moves along the arc-shaped track.

13. The hinge assembly according to claim 12, wherein the seat comprises a bracket and a cover, the bracket comprises an arc-shaped recessed part and the cover comprises an arc-shaped protruded part, and the arc-shaped protruded part is arranged in the arc-shaped recessed part to cooperatively form the arc-shaped track.

14. The hinge assembly according to claim 8, wherein the hinge body further comprises:

a synchronization mechanism comprising a first guide rod gear and a second guide rod gear, the first guide rod gear comprises a first guide rod end and a first gear end, the second guide rod gear comprises a second guide rod end and a second gear end, the second gear end is meshed with the first gear end, and the first gear end and the second gear end are rotatably coupled to the seat; the first guide rod end is slidably coupled to the first support member, and the second guide rod end is slidably coupled to the second support member.

15. The hinge assembly according to claim 14, wherein the driving rod comprises a mating slot, and the first guide rod end comprises a column, and the column extends into the mating slot to drive the driving rod to rotate relative to the seat and move relative to the first support member along the first direction when the first guide rod gear rotates.

16. The hinge assembly according to claim 14, wherein the synchronization mechanism further comprises a gear set comprising an even number of gears meshed with each other, and the gear set has a first end gear meshed with the first gear end and a second end gear meshed with the second gear end.

17. The hinge assembly according to claim 8, wherein the first end of the driving rod is rotatably coupled to the seat, the second end of the driving rod faces the magnet bracket, and the driving rod is slidably coupled to the first support member and the magnet bracket along the first direction.

18. An electronic device, comprising:
a first housing;
a second housing;
a flexible display panel arranged on the first housing and the second housing; and
a hinge assembly comprising:
a hinge body comprising a folded state and an unfolded state;
a driving rod, a first end of the driving rod being slidably coupled to the hinge body, wherein when the hinge body is switched to the folded state or the unfolded state, the driving rod slides relative to the hinge body in a first direction, the first direction being a length direction of the driving rod;
a magnetic assembly slidably coupled to a second end of the driving rod along the first direction; and
a limiting assembly comprising a locked state and an unlocked state, a part of the limiting assembly being located between two opposite surfaces of the driving rod and the magnetic assembly when the limiting assembly is in the locked state, and the limiting assembly being located outside the two opposite surfaces of the driving rod and the magnetic assembly when the limiting assembly is in the unlocked state, wherein when the hinge body is in the folded state, the driving rod presses against the magnetic assembly through the limiting assembly along the first direction such that the magnetic assembly is maintained in a first position; and in response to an operation instruction, the limiting assembly is switched to the unlocked state and the magnetic assembly moves from the first position towards the driving rod along the first direction to a second position, wherein the hinge body is coupled to the first housing and the second housing, and the magnetic assembly and the limiting assembly are both arranged in the first housing;

when the hinge body is in the folded state, the first housing and the second housing are oppositely arranged, the flexible display panel is folded in half, and the magnetic assembly and a second magnetic member arranged in the second housing attract each other; and the limiting assembly is switched to the unlocked state in response to an operation instruction, the magnetic assembly moves from the first position towards the driving rod along the first direction to the second position, the magnetic assembly and the second magnetic member are released from attraction, and the flexible display panel is unfolded.

19. The electronic device according to claim 18, wherein the magnetic assembly comprises:

a magnet bracket slidably coupled to the driving rod along the first direction; and a first elastic member having a first end configured for fixing and a second end coupled to the magnet bracket, wherein when the hinge body is in the folded state, the first elastic member is compressed, and when the limiting assembly is switched to the unlocked state in response to an operation instruction, the first elastic member returns to push the magnetic assembly to move from the first position towards the driving rod along the first direction to the second position.

20. The electronic device according to claim 19, wherein the magnetic assembly comprises a first magnetic member arranged on the magnet bracket; and the hinge assembly further comprises the second magnetic member;

when the magnetic assembly is in the first position, the first magnetic member and the second magnetic member attract each other along a direction perpendicular to the first direction; and when the magnetic assembly is in the second position, an interaction force between the first magnetic member and the second magnetic member is zero.

* * * * *